(12) United States Patent
Feng et al.

(10) Patent No.: US 9,520,737 B2
(45) Date of Patent: Dec. 13, 2016

(54) SPEAKERPHONE BASE FOR AN ELECTRONIC DEVICE

(71) Applicant: Logitech Europe S.A., Lausanne (CH)

(72) Inventors: Sam Feng, Union City, CA (US); Alan Smith, Vancouver, WA (US); Hsueh Jang Su, Pleasanton, CA (US); Timucin Kip, Palo Alto, CA (US); Ali Moayer, Castro Valley, CA (US)

(73) Assignee: Logitech Europe S.A., Lausanne (CH)

( * ) Notice: Subject to any disclaimer, the term of this patent is extended or adjusted under 35 U.S.C. 154(b) by 202 days.

(21) Appl. No.: 14/059,191

(22) Filed: Oct. 21, 2013

(65) Prior Publication Data

US 2015/0110324 A1    Apr. 23, 2015

(51) Int. Cl.
*H02J 7/02*     (2016.01)
*H04R 1/02*     (2006.01)
*G06F 1/16*     (2006.01)
*H02J 5/00*     (2016.01)
*H02J 7/00*     (2006.01)

(52) U.S. Cl.
CPC ............. *H02J 7/025* (2013.01); *G06F 1/1613* (2013.01); *H04R 1/028* (2013.01); *H02J 5/005* (2013.01); *H02J 7/0044* (2013.01); *H04R 2205/021* (2013.01); *H04R 2420/07* (2013.01); *H04R 2499/11* (2013.01); *Y10T 29/49826* (2015.01)

(58) Field of Classification Search
CPC .......... H02J 7/025; H02J 5/005; G06F 1/1613; H04R 1/028; H04R 2205/021; H04R 2420/07; H04R 2499/11; Y10T 29/49826
USPC .......................... 381/334; 29/428; 312/223.1
See application file for complete search history.

(56) References Cited

U.S. PATENT DOCUMENTS

| | | | | |
|---|---|---|---|---|
| 6,115,247 A | * | 9/2000 | Helot ..................... | G06F 1/1632 312/223.1 |
| 6,142,593 A | * | 11/2000 | Kim ....................... | G06F 1/1632 312/223.2 |
| 7,580,255 B2 | * | 8/2009 | Crooijmans .......... | G06F 1/1632 361/679.41 |
| 7,719,830 B2 | * | 5/2010 | Howarth et al. ......... | 361/679.41 |
| 7,933,117 B2 | * | 4/2011 | Howarth ............... | G06F 1/1632 248/917 |
| 7,969,732 B1 | * | 6/2011 | Noble ....................... | 361/679.56 |
| 8,235,208 B2 | * | 8/2012 | Sirichai et al. ............... | 206/320 |
| 8,535,102 B1 | * | 9/2013 | Colahan ................... | H01R 31/06 439/5 |
| 8,559,172 B2 | * | 10/2013 | Byrne .................... | G06F 1/1632 361/679.41 |

(Continued)

*Primary Examiner* — Brian Miller
(74) *Attorney, Agent, or Firm* — Kilpatrick Townsend & Stockton LLP

(57) ABSTRACT

An apparatus comprising a housing having a front portion and a slot formed in the housing, the slot having a plurality of different widths along a length of the slot. The slot includes a first width configured to support a first type of electronic mobile device in a first upright configuration at a first angle relative to the front portion of the housing, and a second width configured to support a second type of electronic mobile device in a second upright configuration at a second angle relative to the front portion of the housing. The first width has a first depth in the slot, the second width has a second depth in the slot, where the first angle is based on the first width and first depth, and the second angle is based on the second width and the second depth.

16 Claims, 7 Drawing Sheets

(56) References Cited

U.S. PATENT DOCUMENTS

| | | | | |
|---|---|---|---|---|
| 8,568,154 B2* | 10/2013 | Chang | ............... | H01R 13/6315 439/173 |
| 8,619,416 B2* | 12/2013 | Lim | ..................... | G06F 1/1632 361/679.41 |
| 8,905,845 B2* | 12/2014 | Willis | .................... | G06F 3/041 361/679.01 |
| 9,080,714 B2* | 7/2015 | Minn | .................. | B60R 11/0241 |
| 2002/0024794 A1* | 2/2002 | Lin | ...................... | G06F 1/1632 361/679.43 |
| 2012/0246374 A1* | 9/2012 | Fino | .............................. | 710/303 |
| 2013/0219098 A1* | 8/2013 | Turnpenny et al. | .......... | 710/303 |
| 2013/0327904 A1* | 12/2013 | Christal | ..................... | 248/176.1 |
| 2014/0139178 A1* | 5/2014 | Large et al. | .................. | 320/108 |
| 2014/0197049 A1* | 7/2014 | Napolitano et al. | ........ | 206/45.24 |
| 2014/0295758 A1* | 10/2014 | Pedersen | ....................... | 455/41.2 |
| 2015/0373440 A1* | 12/2015 | Fontana | ................ | H04R 1/025 381/388 |

* cited by examiner

SPEAKERPHONE BASE FOR AN ELECTRONIC DEVICE

BACKGROUND

Mobile phones, tablet computers, and other handheld mobile electronic devices are more and more commonplace in society and provide users with unprecedented power and convenience. However, where smaller form factors improve in mobility and form factor, they typically suffer in audio quality due to their small integrated speakers. Small speakers tend to lack fidelity and sufficient output power to project voice or music at output levels of sufficient volume and clarity in large offices or conference rooms.

Also, fast internet connections have spawned the advent of video conferencing in mobile devices. Video communication also suffers from the audio limitations of integrated speakers typically found in mobile electronic devices. Furthermore, in video communications, a line of sight is needed from an integrated video camera on the mobile device, thus requiring the user to hold the mobile phone during the conversation, which may be inconvenient, cumbersome, and may prevent multi-tasking users from performing tasks that require two free hands. Thus, improvements and enhancements to mobile devices are needed.

BRIEF SUMMARY

Certain embodiments of the invention include a speakerphone base configured to hold a mobile electronic device, such as a mobile phone or tablet computer, in an upright configuration to facilitate convenient hands-free video conferencing. The speakerphone base can be configured for wireless communication with the mobile electronic device to supplement audio capabilities with improved speaker and microphone designs.

In certain embodiments, an apparatus comprises a housing having a front portion, and a slot formed in the housing, the slot having a plurality of different widths along a length of the slot. The slot can include a first width configured to support a first type of electronic mobile device in a first upright configuration at a first angle relative to the front portion of the housing. The second slot can include a second width configured to support a second type of electronic mobile device in a second upright configuration at a second angle relative to the front portion of the housing. The first width can have a first depth in the slot and the second width can have a second depth in the slot, where the first angle is based on the first width and first depth, and the second angle is based on the second width and the second depth.

In some embodiments, the first angle is configured to align a camera associated with the first type of electronic mobile device with a predetermined elevation at a predetermined distance from the apparatus. Similarly, the second angle can be configured to align a camera associated with the second type of electronic mobile device with the predetermined elevation at the predetermined distance from the apparatus. In some cases, the first type of electronic mobile device is a mobile phone and the second type of electronic mobile device is a tablet computer.

In further embodiments, the housing further comprises a speakerphone, where the speakerphone is wirelessly coupled to the electronic mobile device in the slot, and the speakerphone is operable to receive and play back audio data from the electronic mobile device configured in the slot. The wireless coupling can be based on Bluetooth, Near Field Communication (NFC), or Wi-Fi, among other communication protocols.

In some implementations, the housing further comprises a power source operable to be wirelessly coupled to the electronic mobile device, where the power source is configured to recharge a battery in the electronic mobile device. The housing can be configured to open and close such that the slot is obscured when the housing is closed, and wherein the slot is exposed when the housing is open. The housing can further include a bottom portion with one or more feet disposed thereon that are configured to rest on a surface. The one or more feet can be adjustable and operable to raise or lower a portion of the housing to affect an angle of the housing with respect to the surface. In some cases, the slot includes an adjustable wall operable to change the width of the slot.

In certain embodiments, a method includes receiving a first type of electronic mobile device in a slot formed in a housing, where the slot includes a plurality of different widths along a length of the slot. The plurality of different widths can include a first width configured to support the first type of electronic mobile device in a first upright configuration at a first angle, and a second width configured to support a second type of electronic mobile device in a second upright configuration at a second angle. The first width can configure the first type of electronic mobile device in the first upright configuration. The first and second angle can be relative to a front portion of the housing. In some embodiments, the first width has a first depth in the slot, where the second width has a second depth in the slot, the first angle is based on the first width and first depth, and the second angle is based on the second width and the second depth.

In some embodiments, the method further includes aligning a camera disposed in the first type of electronic mobile device with a predetermined elevation and a predetermined distance from the housing, with the slot being operable to align both a camera associated with the first type of electronic mobile device and a camera associated with the second type of electronic mobile device at the predetermined elevation at the predetermined distance from the housing. In some cases, the first type of electronic mobile device can be a mobile phone and the second type of electronic mobile device can be a tablet computer.

In further embodiments, the housing further includes a speakerphone and the method further includes establishing electronic communication with the first type of electronic mobile device sending and receiving audio data from the first type of electronic mobile device configured in the slot, and playing the audio data through the speakerphone. In some cases, the audio data is received by the speakerphone via wireless coupling based on Bluetooth, Near Field Communication (NFC), Wi-Fi, or other suitable communication protocols. In some implementations, the method further includes charging the electronic mobile device configured in the slot with a local power source, the power source configured to power the electronic mobile device via wireless coupling.

In certain embodiments, a system includes a housing having a front portion, a processor disposed in the housing, a slot formed in the housing, and a a speakerphone disposed in the housing, where the speakerphone is operable to be wirelessly coupled to the electronic mobile device in the slot, and where the speakerphone is operable to receive and play back audio data from the electronic mobile device configured in the slot. The slot can have a plurality of different widths along a length of the slot, including a first width configured to support a first type of electronic mobile device in a first upright configuration at a first angle relative to the front portion of the housing, and a second width configured to support a second type of electronic mobile device in a second upright configuration at a second angle relative to the front portion of the housing. In some cases, the first type of electronic mobile device is a mobile phone and the second type of electronic mobile device is a tablet computer.

DETAILED DESCRIPTION

The present invention relates generally to accessories for input devices. More particularly, the present invention relates to a speakerphone base for an electronic input device.

Certain embodiments of the invention include a speakerphone base with a multi-width slot configured to hold a variety of different mobile electronic devices, such as a mobile phone or tablet computer, in an upright configuration to facilitate convenient hands-free video conferencing. The speakerphone base can include integrated speakers and microphones and may be configured for wireless communication with the mobile electronic device to supplement and improve hands-free audio capabilities.

Figure 1:
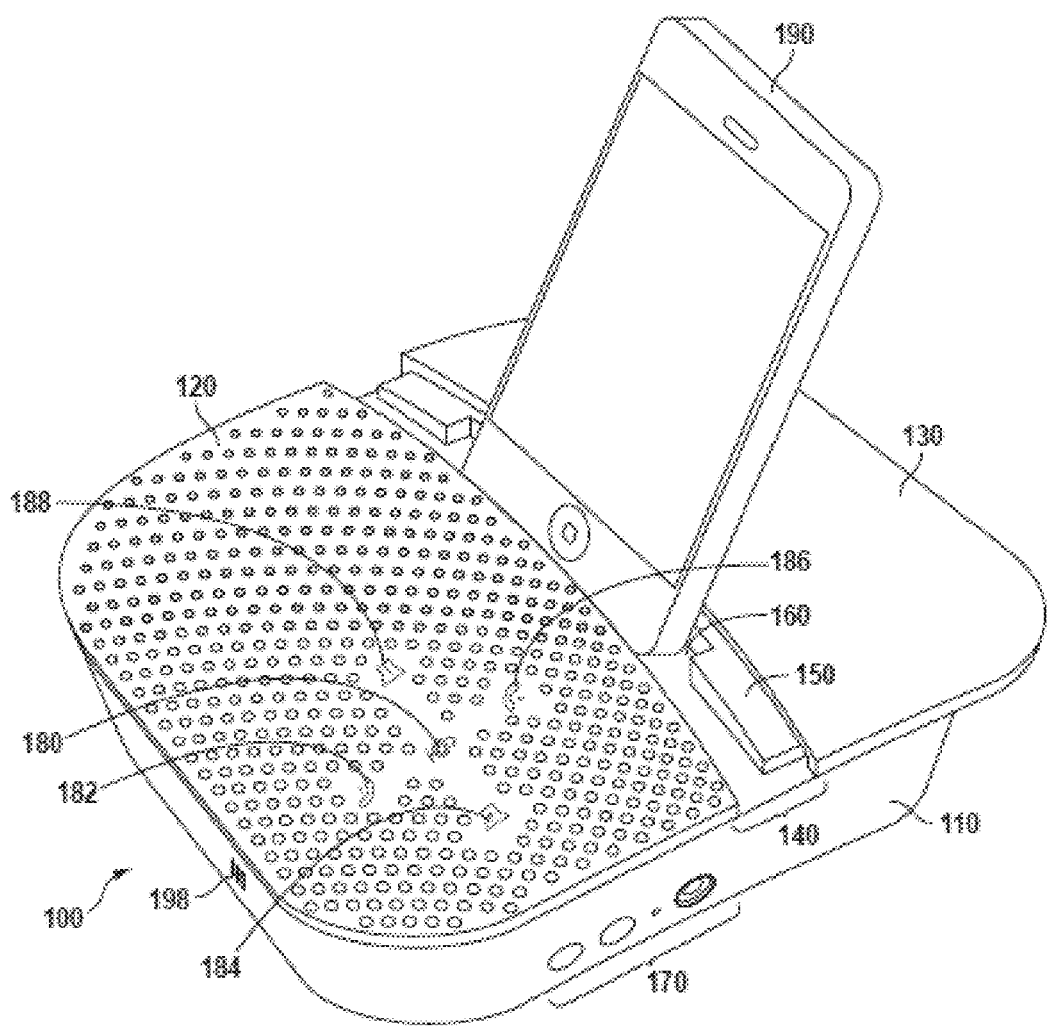
FIG. 1 depicts a simplified diagram showing a speakerphone base for a mobile electronic device, according to certain embodiments of the invention.

FIG. 1 depicts a simplified diagram showing a speakerphone base 100 for a mobile electronic device 190, according to certain embodiments of the invention. Speakerphone base ("base") 100 includes a housing 110, a speaker grille 120, a sliding portion 130, a multi-width slot 140, controls 170, and an input device 190 disposed in slot 140. Input device 190 can include mobile phones, tablet computers, personal digital assistants, or any suitable input device.

Speaker grille 120 can be disposed on the top portion of housing 110. One or more speakers can be disposed within housing 110 under speaker grille 120, or in any suitable location or arrangement. One or more microphones 198 may also be disposed within housing 110. Speaker grille 120 can include a number of buttons or controls disposed thereon including, but not limited to, volume controls 184, 188, speaker mute 180, call pickup 186, and call 182.

Sliding portion 130 can be configured on the top portion of housing 110 and operable to slide open and shut to cover and uncover slot 140, thus presenting a clean, compact, and aesthetically pleasing look. Sliding portion 130 can also be used to support and fine tune the angle at which input device 190 is configured in slot 140. For example, slot 140 may hold input device 190 in an upright configuration at a first angle with respect to the front portion of housing 110. Sliding portion 130 is operable to partially close and press against the back portion of input device 190 while it is in slot 140 to reduce the angle of input device 190 based on the amount sliding portion 130 is closed, as further discussed below with respect to FIG. 7C below.

Multi-width slot 140 includes a support 150 configured to support a first type of input device at a first angle, and a support 160 configured to support a second type of input device at a second angle. The first type of input device can include larger devices wide enough (e.g., along the length of slot 140) and thin enough to span slot 140 such that input device 190 can be propped against support 150. In some embodiments, the first type of input device can include a tablet computer, e-paper, e-reader, or other similarly sized devices. The second type of input device can include smaller devices narrow enough (e.g., along the length of slot 140) and thin enough such that input device 190 can be propped against support 160. In some embodiments, the second type of input device can include a mobile phone, PDA, or other similarly sized devices. Multi-width slot 140 can support the first and second type of input device at an angle that is preferable for hands-free video chatting. The angle of support for each type of device can depend on the width and/or depth of the portion of slot 140 that the input device fits into.

Controls 170 can be disposed on housing 110, according to certain embodiments of the invention. Controls can include a power button, wireless connectivity button (e.g., Bluetooth button), power receptacles (e.g., USB, A/C adaptor, etc.), unit reset switches, and the like. Controls 170 can be disposed in any suitable location on base 100.

Figure 2:
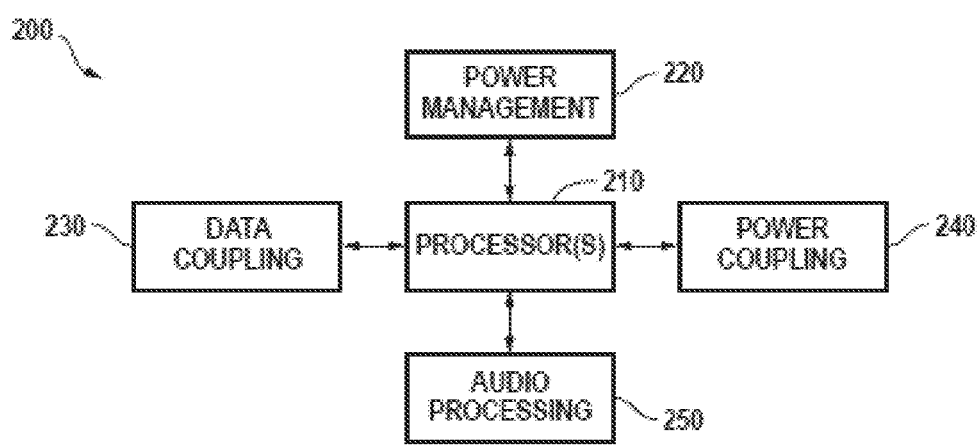
FIG. 2 depicts a simplified block diagram of an electronic system for a speakerphone base, according to certain embodiments of the invention.

FIG. 2 depicts a simplified block diagram of an electronic system 200 for a speakerphone base, according to certain embodiments of the invention. System 200 includes one or more processors 210, a power management system 220, a data coupling block 230, a power coupling block 240, and an audio processing block 250. Each of the system blocks 220-250 can be in electrical communication with processor 210. System 200 may further include additional systems (e.g., memory blocks, touch screen input/outputs, etc.) that are not shown or discussed to prevent obfuscation of the novel features described herein. Similarly, system 200 may include fewer systems (e.g., no power coupling block, etc.) as required by design.

In certain embodiments, processor 210 includes one or more microprocessors (μCs) and is configured to control the operation of system 200. Alternatively, processor 210 may include one or more microcontrollers (MCUs), digital signal processors (DSPs), or the like, with supporting hardware/firmware (e.g., memory, programmable I/Os, etc.), as would be appreciated by one of ordinary skill in the art. Processor 210 can be configured to control the operation of the speakerphone base systems described herein.

Power management system 220 can be configured to manage power distribution, recharge batteries, manage power efficiency, and the like, according to certain embodiments of the invention. For example, power management system 220 can control battery charging and charge distribution. System 200 can be powered by batteries, rechargeable batteries, accumulator(s), renewable power sources (e.g., photovoltaic panels), an AC adaptor, universal serial bus (USB), or other suitable power source. Controls 170 may include a power button, a wireless connect initiation button (e.g., Bluetooth button), an AC jack, or the like.

Data coupling block 230 can be controlled by processor 210 and configured to control data communication between a mobile input device 190 and speakerphone base 100, according to certain embodiments of the invention. In some cases, data coupling block 230 can be configured to send and receive audio data from input device 190 via wireless communication. For example, a wide variety of wireless communication protocols can be used including, but not limited to, Bluetooth, Wi-Fi, Near Field Communication (NFC), infra-red (IR) systems, or other standard or proprietary wireless network communication protocol. Speakerphone base 100 can optionally include a hardwired connector to interface with mobile input devices 190. For example, system 200 may provide a Universal Serial Bus (USB) cable to provide electronic communication to the attached input device or other external devices. Other embodiments of the invention may utilize different types of cables, harnesses, or connection protocol standards to effectuate a hardwired communication with outside entities (e.g., mobile input device 190). In some cases, a USB cable can be used to provide power to system 200 (i.e., recharge batteries) and simultaneously support data communication between data coupling block 230 and input device 190.

Data coupling block 230 can control the sending and receiving of any suitable data type between input device 190 and speakerphone base 100 including document files (e.g., .doc files), database files (.xls files), music files (e.g., .mp3), video data (.mov, .mpeg, etc.) or any other suitable file format. In certain implementations, speakerphone base 100 can include a memory block (not shown) to function as an off-board storage device for one or more input devices 190.

Power coupling block 240 can facilitate wireless power coupling between speakerphone base 100 and input device 190. In some embodiments, power coupling block 240 can wirelessly charge input device 190 via inductive charging. Inductive charging can use a first induction coil to create an alternating electromagnetic filed from within speakerphone base 100, and a second induction coil in input device 190 absorbs power from the electromagnetic field and converts it back into electrical current to charge a local battery. Speakerphone base 100 can include an induction coil configured proximate to slot 140 to ensure good inductive coupling when input device 190 is configured in the upright configuration in slot 140. One or more conduction coils may be configured in speakerphone base 100 in any suitable arrangement as needed. In some embodiments, a hardwired connection between base 100 and input device 190 may facilitate charging functions. Hardwired power coupling may be implemented, e.g., by cable or docking station.

Audio processing block ("audio block") 250 controls audio playback of audio data (e.g., voice data, music data, etc.) received from input device 190, according to certain embodiments of the invention. Audio block 250 may drive one or more speakers disposed under speaker grille 120. In some cases, a microphone 198 is disposed in base 100, which can be used to supplement speakerphone capabilities of input device 190. For example, many input devices 190 include a speakerphone for hands free telecommunications; however, many of the on-board microphones have limited range, fidelity, and sensitivity. A higher quality microphone 198 in base 100 may provide a longer range, higher fidelity, and greater sensitivity to user voices, ambient sounds, etc., as compared to input device 190, for an improved communication experience. In some embodiments, multiple external microphones or speakers may be in wireless communication with speakerphone base 100 to further expand its range and use. Audio block 250 can further control standard audio interfacing controls for input device 190 including volume (184, 188), mute 180, connect 186, disconnect 182, and the like. It should be noted that the embodiments described herein are not exhaustive any configuration or arrangement of speakers, buttons, slot(s), or the like, can be implemented as needed. In some embodiments, a display (e.g., LCD, projector) can be implemented to play back video information that may or may not correlate with video data displayed on input device 190.

Multiple microphones (not shown) can be included and configured in a microphone array. In some implementations, direction sounds can be achieved with a microphone array. Directional sound concentrates acoustic energy into a narrow beam so that it can be projected in any discrete area, similar to how a spotlight directs light. In some embodiments, speakerphone base 100 can pair with multiple devices including a pair of headphones.

Each of the system blocks 220-250 are in electrical communication with processor 210. System 200 may further include additional systems that are not shown or discussed to prevent obfuscation of the novel features described herein. The system blocks described herein can be implemented in whole or in part to any of the embodiments described herein.

Figure 3A:
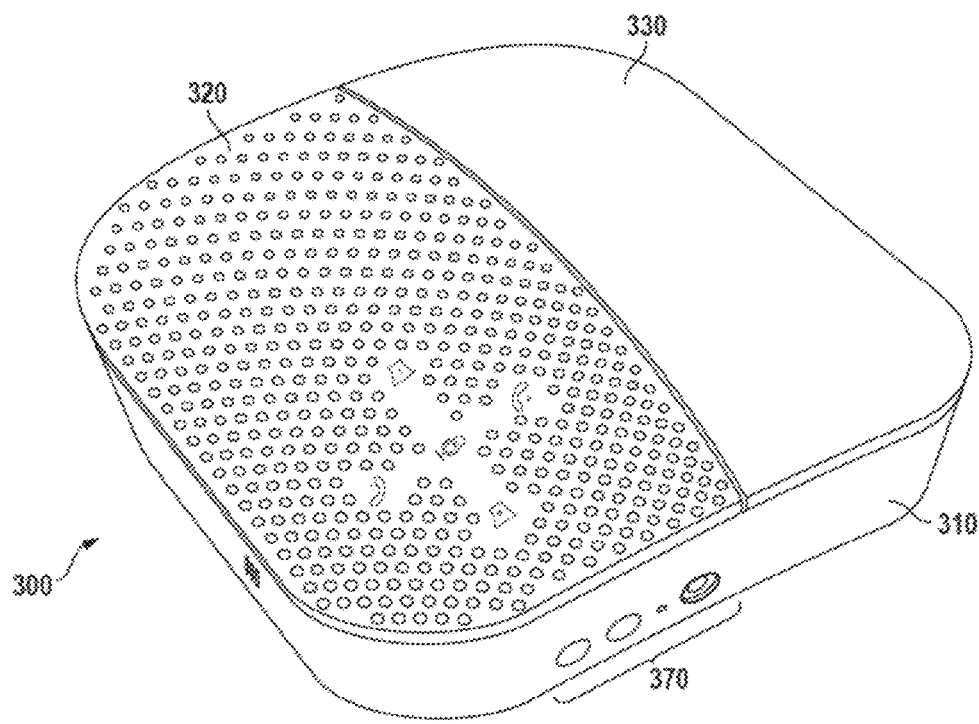
FIG. 3A depicts a simplified diagram of a speakerphone base in a closed configuration, according to certain embodiments of the invention.

FIG. 3A depicts a simplified diagram of speakerphone base 300 in a closed configuration, according to certain embodiments of the invention. Base 300 includes housing 310, speaker grille 320, sliding portion 330, and controls 370. Speakerphone base 300 is shown in a closed configuration, where multi-width slot 340 is obscured by sliding portion 330.

Figure 3B:
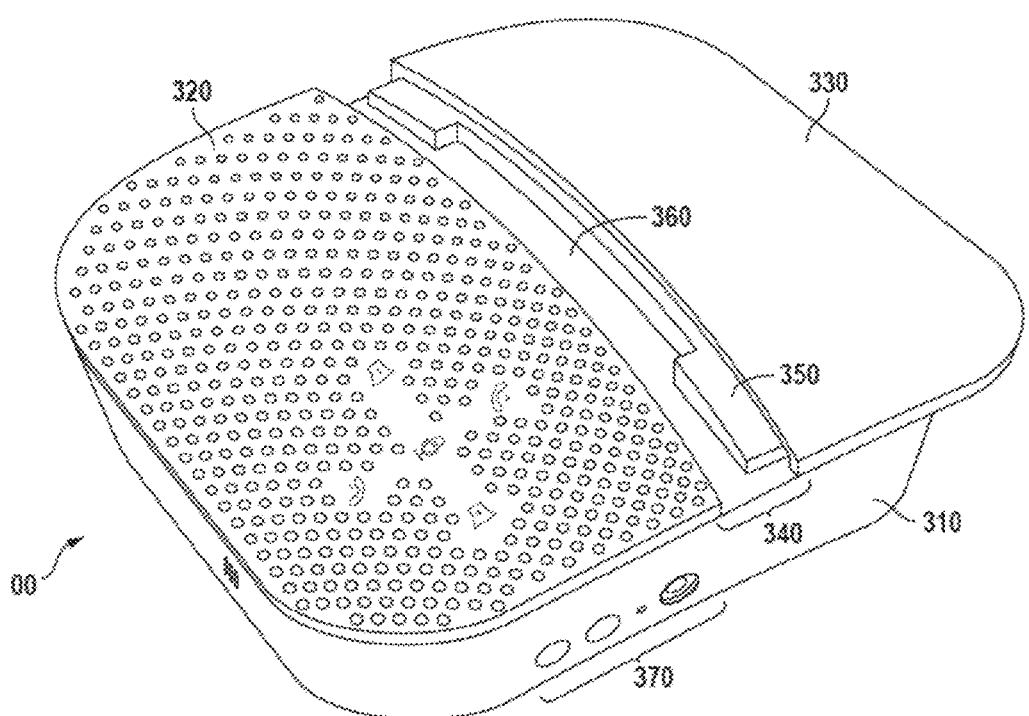
FIG. 3B depicts a simplified diagram of a speakerphone base in an open configuration with the multi-width slot exposed, according to certain embodiments of the invention.

FIG. 3B depicts a simplified diagram of a speakerphone base in an open position with the multi-width slot exposed, according to certain embodiments of the invention. Base 300 includes housing 310, speaker grille 320, sliding portion 330, and controls 370. Speakerphone base 300 is shown in an open configuration, where sliding portion 330 is slid back, exposing multi-width slot 340. Multi-width slot 140 includes a support 150 configured to support a first type of input device in a first upright configuration at a first angle, and a support 160 configured to support a second type of input device in a second upright configuration at a second angle. The first type of input device can include larger devices wide enough (e.g., along the length of slot 140) and thin enough to span slot 140 such that input device 190 can be propped against support 150. In some embodiments, the first type of input device can include a tablet computer, e-paper, e-reader, or other similarly sized devices. The second type of input device can include smaller devices narrow enough (e.g., along the length of slot 140) and thin enough such that input device 190 can be propped against support 160. In some embodiments, the second type of input device can include a mobile phone, PDA, or other similarly sized devices. Multi-width slot 140 can support the first and second type of input device at an angle that is preferable for hands-free video chatting. The angle of support for each type of device can depend on the width and/or depth of the portion of slot 140 that the input device fits into.

Figure 4:
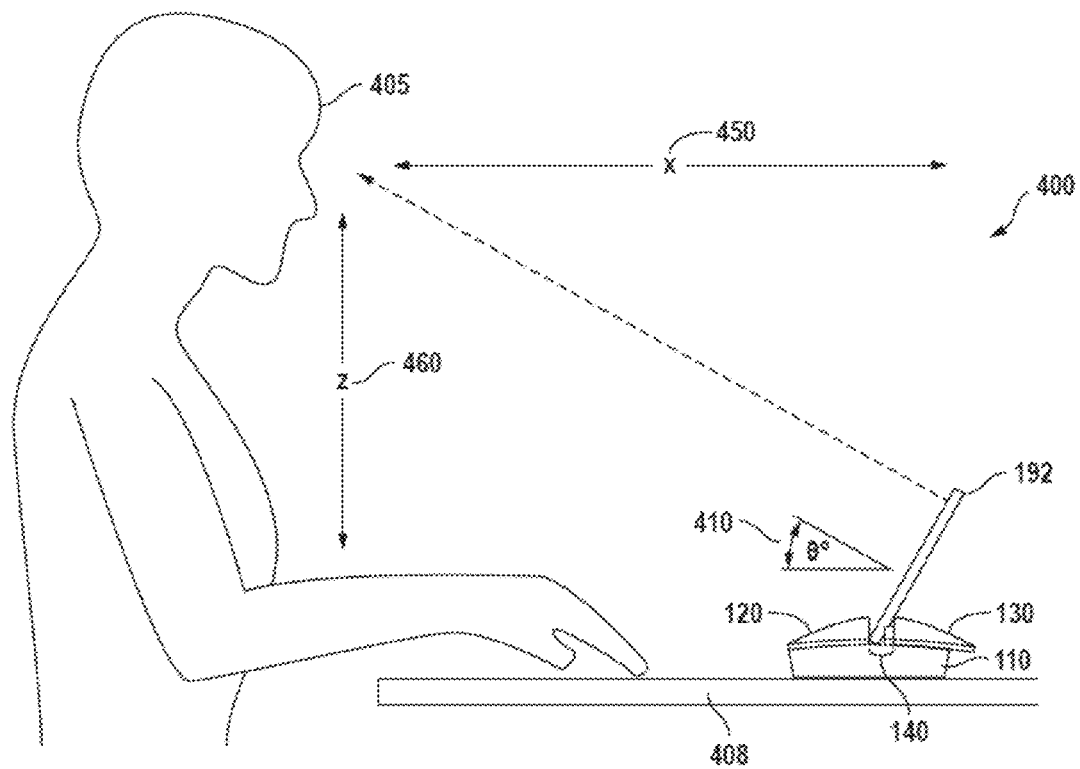
FIG. 4 depicts a simplified diagram of a user video conferencing with a mobile phone disposed in the slot of a speakerphone, according to certain embodiments of the invention.

FIG. 4 depicts a simplified diagram 400 of a user 405 video conferencing with a mobile phone 192 disposed in slot 140 of speakerphone base 100, according to certain embodiments of the invention. Speakerphone base 100 is resting on surface 408 and configured a predetermined distance from user 400. Mobile phone 192 is configured at an angle 410 to align a camera disposed in the housing of mobile phone 192 with a predetermined elevation 460 at a predetermined distance 450 from speakerphone 100. One function of propping up an input device 190 (e.g, mobile phone 192) at angle 410 is to orient it in such a manner that the upper torso of user 405, and more importantly user 405's face, is in the line-of-sight of the camera disposed in mobile phone 192. In other words, speakerphone base 100 provides for hands-free video conferencing experience for any type of input device, regardless of form factor, due to the many configuration possibilities of multi-width slot 140. Although FIG. 4 depicts a mobile phone disposed in slot 140 (and support 160), any similarly sized device can be used in that portion of slot 140 including different sized mobile phones, PDAs, and the like. Those of ordinary skill in the art would understand the appropriate angles and dimensions of slot 140 required to achieve proper line-of-site configurations.

Figure 5:
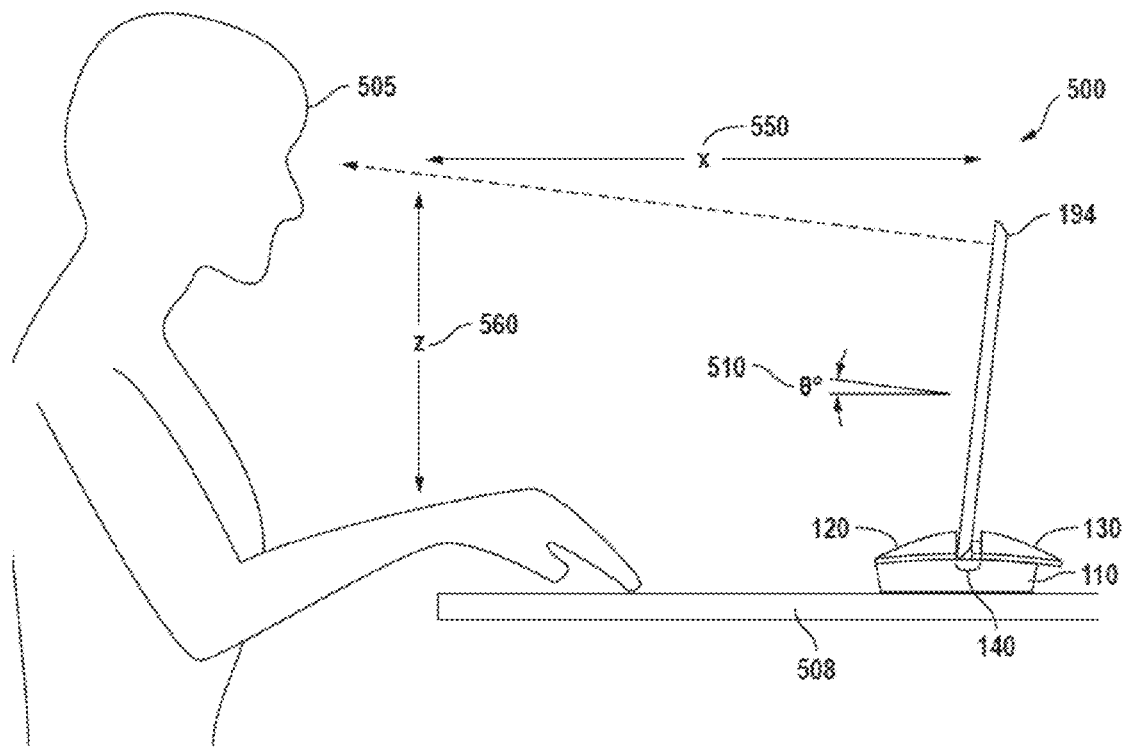
FIG. 5 depicts a simplified diagram of a user video conferencing with a tablet computer disposed in the slot of a speakerphone, according to certain embodiments of the invention.

FIG. 5 depicts a simplified diagram 500 of a user 505 video conferencing with a tablet computer 195 disposed in slot 140 of speakerphone base 100, according to certain embodiments of the invention. Speakerphone base 100 is resting on surface 508 and configured a predetermined distance from user 505. Tablet computer 195 is configured at an angle 510 to align a camera disposed in the housing of tablet computer 195 with a predetermined elevation 560 at a predetermined distance 550 from speakerphone base 100. One function of propping up an input device 190 (e.g, tablet computer 195) at angle 510 is to orient it in such a manner that the upper torso of user 505, and more importantly user 505's face, is in the line-of-sight of the camera disposed in tablet computer 195. In other words, speakerphone base 100 provides for hands-free video conferencing experience for any type of input device, regardless of form factor, due to the many configuration possibilities of multi-width slot 140. Although FIG. 5 depicts a tablet computer 195 disposed in slot 140 (and support 150), any similarly sized device can be used in that portion of slot 140 including different sized tablets, e-readers, e-paper, and the like.

Those of ordinary skill in the art would understand the appropriate angles and dimensions of slot 140 required to achieve proper line-of-site configurations.

Figure 6:
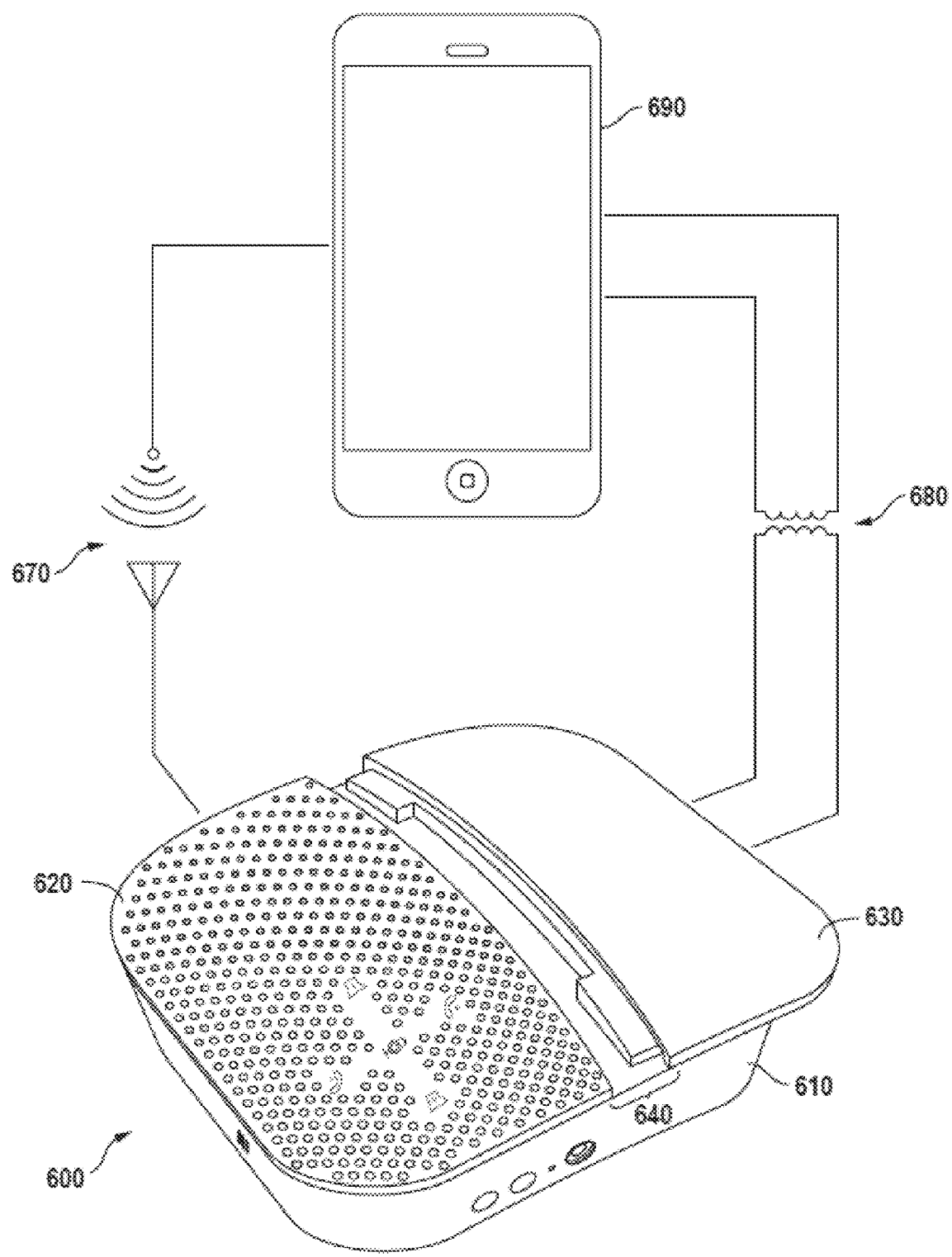
FIG. 6 depicts a simplified diagram of audio coupling and power coupling functions of the speakerphone, according to certain embodiments of the invention.

FIG. 6 depicts a simplified diagram of audio coupling 670 and power coupling coupling 680 functions of the speakerphone base 600, according to certain embodiments of the invention. Speakerphone base 600 includes a housing 610, speaker grille 620, sliding portion 630, and multi-width slot 640. In some cases, speakerphone 600 can be similar to speakerphone 100 described above.

Speakerphone 600 can be configured for electronic communication 670 with input device 690. In some embodiments, electronic communication 670 can be operated by the processor and data coupling block 230, as described above. In operation, speakerphone base 600 can be configured to receive and play back audio data from the electronic mobile device configured in the slot (e.g., voice data, music data, etc.). The wireless coupling can be based on Bluetooth, Near Field Communication (NFC), Wi-Fi, infra-red (IR) systems, or other suitable communication protocol.

It should be noted that electronic communication 670 can include the transfer of any suitable data type between input device 690 and speakerphone 600 including document files (e.g., .doc files), database files (.xls files), music files (e.g., mp3), video data (.mov, .mpeg, etc.) or any other suitable file format. In certain implementations, speakerphone base 100 can include a memory block (not shown) to function as an off-board storage device for one or more input devices 190. Speakerphone base 100 can optionally include a hardwired connector to interface with mobile input devices 190. For example, system 200 may provide a Universal Serial Bus (USB) cable to provide electronic communication to the attached input device or other external devices. Other embodiments of the invention may utilize different types of cables, harnesses, or connection protocol standards to effectuate a hardwired communication with outside entities (e.g., mobile input device 190). In some cases, a USB cable can be used to provide power to system 200 (i.e., recharge batteries) and simultaneously support data communication between data coupling block 230 and input device 190.

In certain implementations, speakerphone base 600 can be power coupled to input device 690 to provide wireless recharging functions. For example, power generated by speakerphone base 600 can be wirelessly routed to input device 690 to recharge its batteries. In some embodiments, speakerphone base 600 can wirelessly charge input device 190 via inductive charging 680. Speakerphone base 600 can include an induction coil configured proximate to slot 640 to ensure good inductive coupling when input device 690 is configured in the upright configuration in slot 640. One or more conduction coils may be configured in speakerphone base 600 in any suitable arrangement as needed. Power coupling can be implemented by power management system 220, as discussed above. In some embodiments, a hardwired connection between base 600 and input device 690 can also facilitate battery charging functions. For example, a cable or a "docking station" can be included in slot 640.

In some embodiments, speakerphone base 600 can be charged by kinetic charging. Kinetic charging includes the ability to transform physical motion into an electric charge, e.g., to recharge a battery. In practice, a user may carry around speakerphone base 600 in a bag such that it shift and bounces around as its being carried. The physical movements can be translated into electrical energy to recharge the battery in speakerphone base 600 and eventually input device 690 via wireless or hardwired coupling.

Figure 7A:
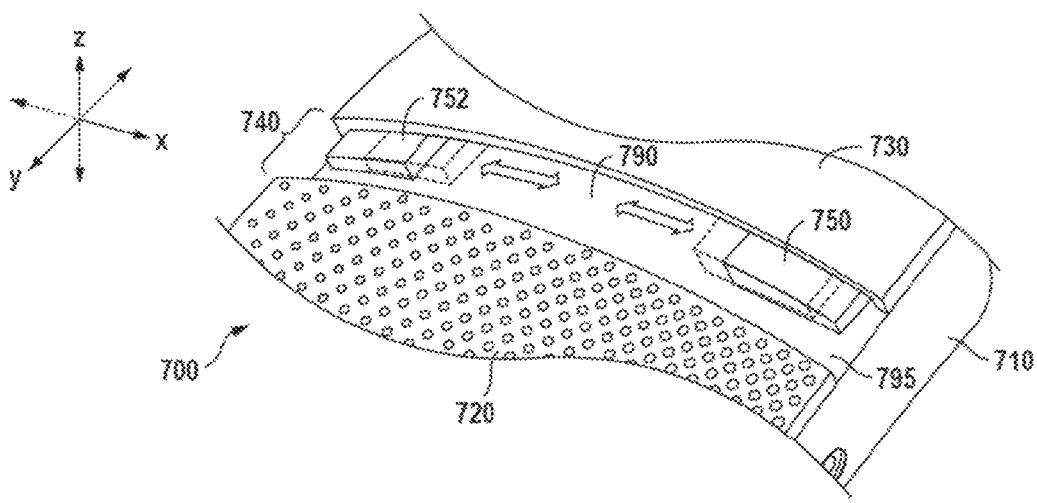
FIG. 7A depicts a simplified diagram illustrating aspects of a customizable length of a slot, according to certain embodiments of the invention.

FIG. 7A depicts a simplified diagram 700 illustrating aspects of a customizable width of a slot 740, according to certain embodiments of the invention. As described above, an input device can be configured in an upright configuration when placed in slot 740, where the angle of the upright configuration can depend on the width, length, and/or depth of slot 740. For the sake of clarity, the length refers to the distance along the slot from the left side of housing 710 to the right side of housing 710. In some cases, portions of slot 740 that are configured for smaller devices (e.g., mobile phones) will run only portion of the full length of the overall length of slot 740 (e.g., see support 760). The length is referred to as the x-direction. The width refers to how wide the slot is from the front wall of slot 740 to the rear wall of slot 740. The width can vary along the full length of slot 740 (e.g., see support 760 vs. support 750). The width is referred to as the y-direction. The depth can be defined as the distance from the bottom of slot 740 to the top of slot 740, or other suitable feature. The depth is referred to as the z-direction.

Referring back to FIG. 7A, multi-width slot 740 is disposed in housing 710. Multi-width slot 740 includes inner slot portion 790 and outer slot portion 795. Inner slot portion 790 is configured to support a variety of input devices with wider (i.e., thicker) form factors including mobile phones, PDAs, and the like. The length of inner slot portion 790 can be changed (e.g., along the x-axis) by controlling the position of adjustable supports 750, 752, as shown. Thus, the length of inner slot portion 790 can be adjusted to accommodate, e.g., mobile phones of varying sizes. The length of inner slot portion 790 can be adjusted with a thumb screw, manual adjustment (e.g., slides with frictional resistance), or any suitable means (e.g., mechanical adjustment, electrical adjustment, etc.) to adjust the length of inner slot portion 790 to the desired configuration. In some embodiments, adjustable supports 750 and 752 can be configured to move independently from each other. Alternatively, adjustable supports 750, 752 may be integrated such that they to move together or apart in unison. The many embodiments, permutations, and configuration of adjustable supports 750, 752, can be applied to any of the embodiments described herein, as would be understood by one of ordinary skill in the art with the benefit of this disclosure. For example, adjustable supports 750, 752 may be configured to move in multiple dimensions (x, y, or z-axis) in unison or independent from one another.

Figure 7B:
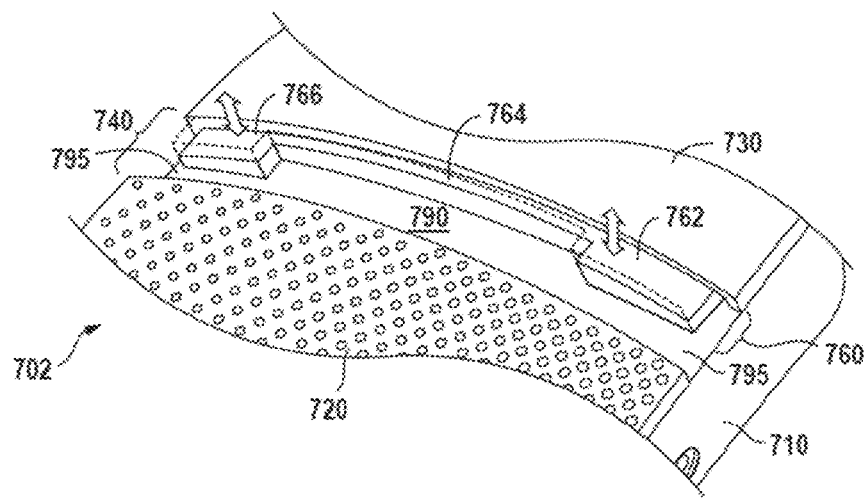
FIG. 7B depicts a simplified diagram illustrating aspects of a customizable depth of a slot, according to certain embodiments of the invention.

FIG. 7B depicts a simplified diagram 702 illustrating aspects of a customizable depth of a slot 740, according to certain embodiments of the invention. Multi-width slot 740 is disposed in housing 710 and includes inner slot portion 790 and outer slot portion 795. Inner slot portion 790 is configured to support a variety of input devices with wider form factors including mobile phones, PDAs, and the like. Outer slot portion 795 is configured to support a variety of input devices that are thinner with longer bases including tablet computers and the like. The height of inner slot portion 790 and/or outer slot portion 795 can be changed by controlling the position of adjustable supports 760 along the z-axis, as shown. Thus, the height of inner and outer slot portions 790, 795 can be adjusted to accommodate input devices of varying sizes (e.g., mobile phones). The height of slot portions 790, 795 can be adjusted with a thumb screw, manual movement (e.g., can slide with a frictional resistance), or any mechanical, frictional, or electrical means to adjust the length of inner and/or outer slot portion 790, 795 to any desired size or dimension.

In some embodiments, adjustable support 760 can include multiple sections configured to move independently from each other. For example, adjustable support 760 can include right support section 762, center support section 764, and left support section 766, with each section configured for independent adjustment such that each section can be set to different heights. Alternatively, adjustable support 760 may be integrated such that each section 762, 764, 766 move up or down in unison. The many embodiments, permutations, and configuration of adjustable support 760 can be applied to any of the embodiments described herein, as would be understood by one of ordinary skill in the art with the benefit of this disclosure. For example, each section 762, 764, 766 can be configurable to move in the x, y, or z axis independently, in unison, in complementary fashion, or other variation thereof.

The height of adjustable support 760 can affect the angle input devices 190 is positioned. For example, lower configurations of adjustable support 760 may cause input device 190 to lean farther back for an increased angle with respect to the front of housing 710, while higher configurations of adjustable support 760 may cause input device 190 to be positioned in a more upright configuration (i.e., reduced angle with respect to the front of housing 710). In some embodiments, the bottom portion or "floor" of slot 740 may be adjustable such that lowering the floor effectively increases the "height" of slot 740.

Figure 7C:
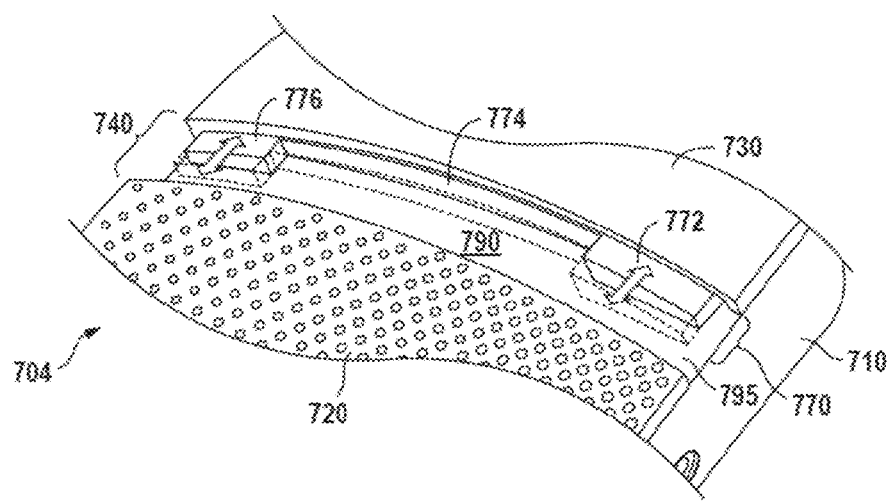
FIG. 7C depicts a simplified diagram illustrating aspects of a customizable width of a slot, according to certain embodiments of the invention.

FIG. 7C depicts a simplified diagram 704 illustrating aspects of a customizable width of a slot 740, according to certain embodiments of the invention. Housing 710 includes a multi-width slot 740, speaker grille 720, and slidable portion 730. Multi-width slot 740 is disposed in housing 710 and includes inner slot portion 790 and outer slot portion 795. Inner slot portion 790 is configured to support a variety of input devices with wider form factors including mobile phones, PDAs, and the like. Outer slot portion 795 is configured to support a variety of input devices that are thinner with longer bases including tablet computers and the like. The width of both the inner slot portion 790 and outer slot portion 795 can be changed by controlling the position of adjustable supports 770 along the y-axis, as shown. Thus, the width of both inner or outer slot portions 790, 795 can be adjusted to accommodate input devices of varying thicknesses. The width of inner slot portion 790 or outer slot portion 795 can be adjusted with a thumb screw, manual movement (e.g., can slide with a frictional resistance), or any mechanical, frictional, or electrical means to adjust the width of inner our outer slot portions 790, 795 to any desired size.

In some embodiments, adjustable support 770 can include multiple sections configured to move independently from each other. For example, adjustable support 770 can include right support section 772, center support section 774, and left support section 776, with each section configured for independent adjustment such that each section can be set to different widths. Alternatively, adjustable support 770 may be integrated such that each section 762, 764, 766 in and out (i.e., changing the width) changing the width in unison. The many embodiments, permutations, and configuration of adjustable support 770 can be applied to any of the embodiments described herein, as would be understood by one of ordinary skill in the art with the benefit of this disclosure.

For example, each section 772, 774, 776 can be configurable to move in the x, y, or z axis independently, in unison, in complementary fashion, or other variation thereof.

The width of the inner slot portion 790 or outer slot portion 795 can affect the angle that input devices 190 rests in positioned. For example, wider configurations of adjustable support 770 may cause input device 190 to lean farther back for an increased angle with respect to the front of housing 710, while narrower configurations of adjustable support 760 may cause input device 190 to be positioned in a more upright configuration (i.e., reduced angle with respect to the front of housing 710), dependent upon the thickness or width of input device 190. In some implementations, the speaker grille portion 720 of housing 710 may be configured to slide in the y-direction, thus effectively changing the width of both inner slot portion 790 and outer slot portion 795.

In certain embodiments, sliding portion 730 of housing 710 can be configured to adjust the effective width and height of slot 740. For example, with input device 190 configured in slot 140, sliding portion 730 can be moved toward a closed position until it abuts input device 190, thus providing additional support. By moving sliding portion 730 further toward a closed position, the effective width of slot 740 is reduced and input device 190 is pushed such that its upright angle is reduced (with respect to the front of housing 110). Thus, sliding portion 730 can be used as another way to set the upright reclining angle (i.e., angle of support) of input device 190 or as a method of "fine tuning" to a desired viewing angle. In some cases, the effective height of slot 740 is also affected by sliding portion 730. For example, sliding portion 730 is situated higher than adjustable support 770 by virtue of the fact that it can slide over slot 740 to obscure it from view. Thus, by using sliding portion 730 alone or in combination with adjustable support 770, the effective height of slot 740 is increased, which can affect the angle of support for input device 190.

Some embodiments include supplemental pieces or inserts to affect the depth/height, width, or length of inner slot portion and/or outer slot portion 795. For example, spacers placed on the "floor" of slot 740 can effectively reduce the overall height of slot 740. Spacers configured on the "sides" of slot 740 can effectively reduce the overall width (y-axis) of slot 740. In some embodiments, the depth of slot 740 (i.e., height of slot 740) may be uniform, or may include a number of gradations in depth to accommodate different devices. Alternatively, some spacers are integrated into base 700 and can rotate or fold over from a passive position that does not affect any slot 740 dimensions, to an active position that affects one or more slot 740 dimensions. Any suitable integrated or separate apparatus can be used to affect the dimensions of slot 740, as would be appreciated by one or ordinary skill in the art. In some cases, magnets or adhesive materials can be used to provide additional support strength to hold input device 190 in its upright configuration in slot 740.

Figure 9A:
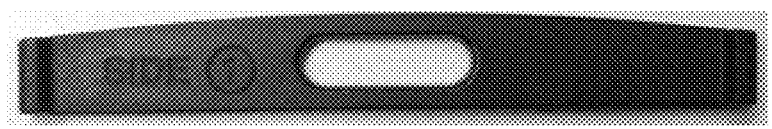
FIG. 9A illustrates aspects of a spacer configured to alter the dimensions and characteristics of a multi-width slot to accommodate different sized mobile devices, according to certain embodiments of the invention.
Figure 9B:
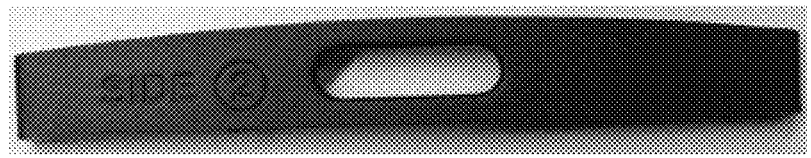
FIG. 9B illustrates aspects of a spacer configured to alter the dimensions and characteristics of a multi-width slot to accommodate different sized mobile devices, according to certain embodiments of the invention.
Figure 9C:
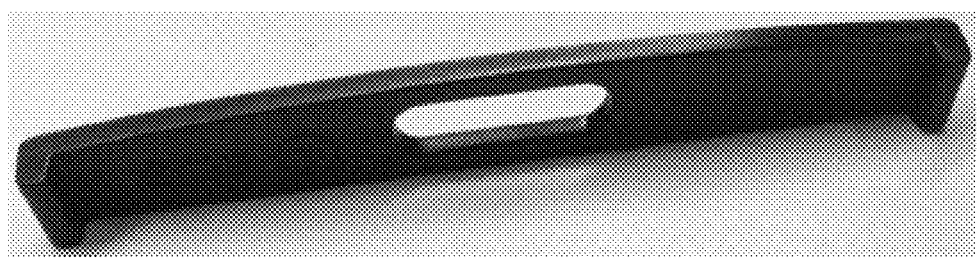
FIG. 9C illustrates aspects of a spacer configured to alter the dimensions and characteristics of a multi-width slot to accommodate different sized mobile devices, according to certain embodiments of the invention.
Figure 9D:
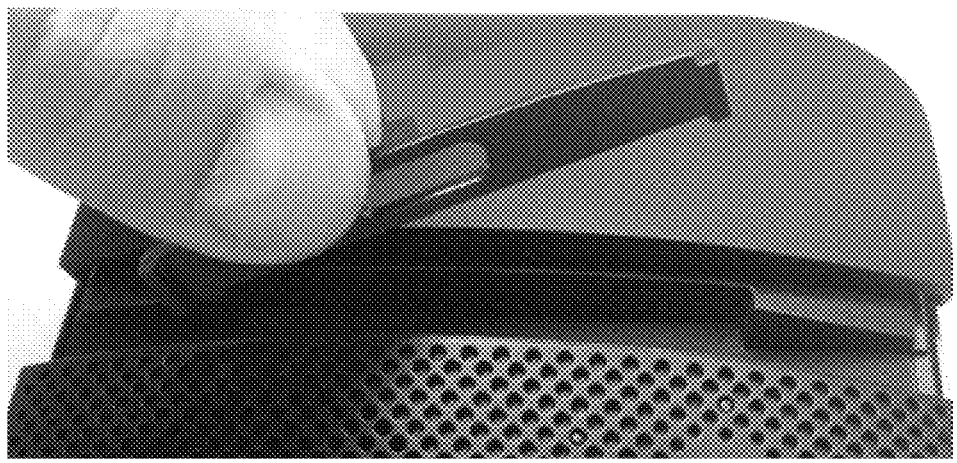
FIG. 9D illustrates aspects of a spacer configured to alter the dimensions and characteristics of a multi-width slot to accommodate different sized mobile devices, according to certain embodiments of the invention.
Figure 9E:
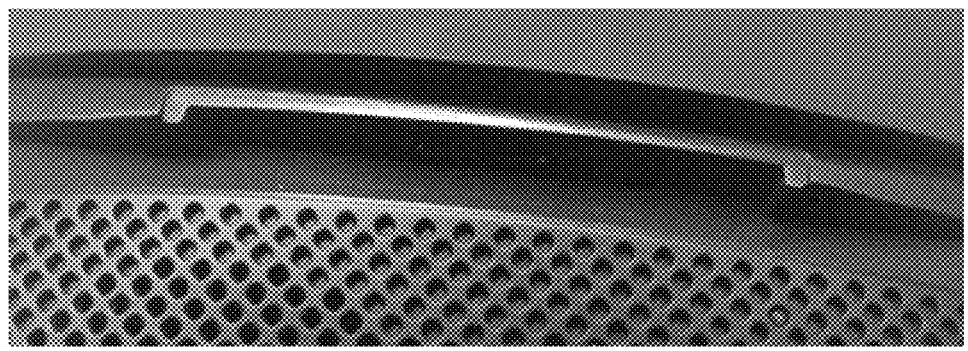
FIG. 9E illustrates aspects of a spacer configured to alter the dimensions and characteristics of a multi-width slot to accommodate different sized mobile devices, according to certain embodiments of the invention.

In some embodiments, a spacer like the one depicted in FIGS. 9A-9E can be used to adjust any of the dimensions (x,y,z axis) and affect the angle of input device when placed in the multi-width slot. FIG. 9A depicts one embodiments of a spacer in a front view. FIG. 9B shows the space from a rear view. FIG. 9C shows the spacer in a perspective view. FIG. 9D shows how the spacer can be placed in the slot, according to an embodiment of the invention. FIG. 9E shows the spacer configured in the slot such that it directly affects the effective width and length of the inner portion of the slot, and indirectly affects the angle which an input device is situated in the slot. In some implementations, spacers can be used to accommodate different size mobile devices.

Figure 8:
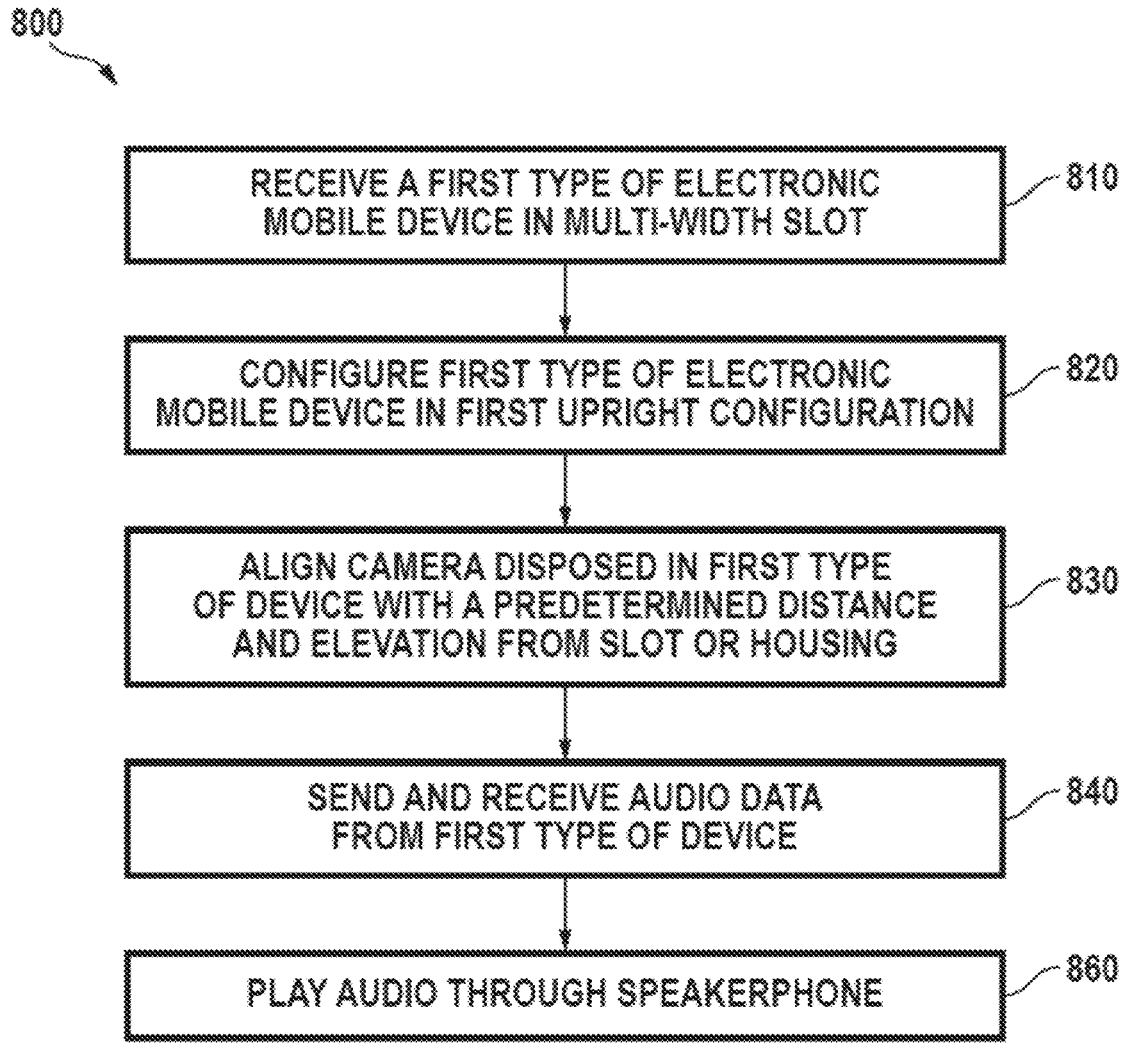
FIG. 8 illustrates a simplified flow diagram of a method of configuring a mobile electronic device on the speakerphone, according to certain embodiments of the invention.

FIG. 8 depicts a simplified flow diagram illustrating aspects of a method 800 of configuring a mobile electronic device on a speakerphone base 100, according to certain embodiments of the invention. It should be noted that speakerphone base 100 can include aspects of any of the embodiments described throughout the disclosure.

Method 800 begins with receiving a first type of electronic mobile device 190 in slot 140 formed in housing 110 (810). Slot 140 can include a plurality of different widths along a length of the slot, including a first width configured to support the first type of electronic mobile device in a first upright configuration at a first angle. Some embodiments can include different heights along slot 140. A second width of slot 140 is configured to support a second type of electronic mobile device in a second upright configuration at a second angle. The first type of input device can include larger devices wide enough (e.g., along the length of slot 140 or x-axis) and thin enough to span slot 140 such that input device 190 can be propped against support 150. In some embodiments, the first type of input device can include a tablet computer, e-paper, e-reader, or other similarly sized devices. The second type of input device can include smaller devices narrow enough (e.g., along the length of slot 140 or y-axis) and thin enough such that input device 190 can be propped against support 160. In some embodiments, the second type of input device can include a mobile phone, PDA, or other similarly sized devices. Multi-width slot 140 can support the first and second type of input device at an angle that is preferable for hands-free video chatting. The angle of support for each type of device can depend on the width and/or depth of the portion of slot 140 that the input device fits into. In certain embodiments, the first width has a first depth in slot 140, and the second width has a second depth in slot 140, where the first angle is based on the first width and first depth, and wherein the second angle is based on the second width and the second depth.

Method 800 continues with configuring the first type of electronic mobile device in the first upright configuration in slot 140 (820), and aligning a camera disposed in the first type of electronic mobile device with a predetermined elevation and a predetermined distance from the housing (or slot), where the slot is operable to align both a camera associated with the first type of electronic mobile device and a camera associated with the second type of electronic mobile device at the predetermined elevation at the predetermined distance from the housing (830). One function of placing a smaller input device 190 (e.g., mobile phone) in inner slot portion 790 and propping it up at angle 410 is to orient it in such a manner that the upper torso of user 405, and more importantly user 405's face, is in the line-of-sight of the camera disposed in mobile phone 192, as shown in FIG. 4. In other words, speakerphone base 100 provides for hands-free video conferencing experience for any type of input device, regardless of form factor, due to the many configuration possibilities of multi-width slot 140. Similarly, propping up larger input device 190 (e.g, tablet computer 195) at angle 510 in outer slot portion 795 can orient larger devices orient it in such a manner that the upper torso of user 505, and more importantly user 505's face, is in the line-of-sight of the camera disposed in tablet computer 195. Thus, input device 190 can be configured at an angle 410 to align a camera disposed in the housing of input device 190 with a predetermined elevation at a predetermined distance from speakerphone 100 (i.e., user's eye level) for optimal viewing conditions. In some cases, the first and second angle are measured relative to a front portion of the housing.

Method 800 continues with sending and receiving audio data from the first type of electronic mobile device configured in the slot 140 (840) and playing the audio data through speakerphone 120 (850). In some cases, the audio data is received by the speakerphone via wireless coupling based on Bluetooth, Near Field Communication (NFC), Wi-Fi, or other suitable communication protocols.

It should be appreciated that the specific steps illustrated in FIG. 8 provides a particular method of configuration a mobile electronic device on a speakerphone base, according to an embodiment of the invention. Other sequences of steps may also be performed according to alternative embodiments. In certain embodiments, method 800 may perform the individual steps in a different order, at the same time, or any other sequence for a particular application. For example, alternative embodiments may include audio coupling prior to configuring input device 190 in slot 140. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. An apparatus comprising:
a housing having a front portion; and
a slot formed in the housing and defined by:
   a front wall positioned within the front portion of the housing, and
   a rear wall facing the front wall, the rear wall including:
      a first support section separated from the front wall by a first distance, and
      a second support section offset laterally from the first support section and separated from the front wall by a second distance greater than the first distance,
   wherein the slot is sized to receive an end portion of an electronic mobile device and orient a display of the electronic mobile device towards the front portion of the housing.

2. The apparatus of claim 1 wherein a first region of the slot between the front wall and the first support section has a first depth, wherein a second region of the slot between the second support section and the front wall has a second depth, wherein the electronic mobile device is oriented at a first angle that is based on the first distance and first depth when positioned in the first region, and wherein the electronic mobile device is oriented at a second angle that is based on the second distance and the second depth when positioned in the second region.

3. The apparatus of claim 2 wherein when an end of a first type of electronic mobile device is positioned in the first region and at the first angle, a camera associated with the first type of electronic mobile device is aligned with a predetermined elevation at a predetermined distance from the apparatus, and wherein when an end of a second type of electronic mobile device is positioned in the second region and at the second angle, a camera associated with the second type of electronic mobile device is aligned with the predetermined elevation at the predetermined distance from the apparatus.

4. The apparatus of claim 3 wherein the first type of electronic mobile device is a mobile phone and the second type of electronic mobile device is a tablet computer.

5. The apparatus of claim 2 wherein the first region and the second region have the same depth.

6. The apparatus of claim 1 wherein the front portion of the housing comprises a speakerphone, wherein the speakerphone is wirelessly coupled to the electronic mobile device in the slot, and wherein the speakerphone is operable to receive and play back audio data from the electronic mobile device configured in the slot.

7. The apparatus of claim 1 wherein the housing further comprises a power source operable to be wirelessly coupled to the electronic mobile device, wherein the power source is configured to recharge a battery in the electronic mobile device.

8. The apparatus of claim 1, further comprising a sliding portion configured to slide from an open position in which the slot is uncovered to a covered position in which the slot is covered, wherein the sliding portion is positioned in direct contact with the front wall of the front portion of the housing in the covered position.

9. The apparatus of claim 1 wherein the slot includes an adjustable wall operable to change a distance between the front wall and the rear wall.

10. A system comprising:
a housing, including:
   a front wall, and
   a rear wall facing the front wall, the rear wall comprising a lateral portion and a central portion recessed behind the lateral portion, the front and rear walls cooperating to define a slot including:
      a first region extending between the central portion and the front wall, and
      a second region extending between the lateral portions and the front wall, wherein a distance between the lateral portion and the front wall is less than a distance between the central portion and the front wall, the first and second regions of the slot being sized differently to support an electronic mobile device at different angles; and a speaker disposed in the housing, wherein the speaker is operable to be wirelessly coupled to the electronic mobile device in the slot, and wherein the speaker is operable to receive and play back audio data from the electronic mobile device.

11. The system of claim 10 wherein the first region of the slot is sized to support a mobile phone and the second region is sized to support a tablet computer.

12. A system, comprising:
a housing;
a slot formed in the housing and defined by:
    a first wall positioned within a portion of the housing, and
    a second wall facing the first wall, the second wall including:
        a first support section separated from the first wall by a first distance, and
        a second support section offset laterally from the first support section and separated from the first wall by a second distance greater than the first distance; and
an electronic device having an end portion positioned within the slot.

13. The system of claim 12, wherein the first support section is configured to orient the electronic device at a first angle and the second support section is configured to positioned the electronic device at a second angle different than the first angle.

14. The system of claim 12, wherein the housing further comprises a speaker, the speaker being closer to the first wall than the second wall.

15. The system of claim 12, further comprising a wireless antenna disposed within the housing and configured to communicate wirelessly with the electronic device.

16. The system of claim 12, further comprising a wireless charging device positioned within the housing and configured to wirelessly charge the electronic device positioned within the slot.

* * * * *